Oct. 30, 1945. P. S. RUSSEL 2,387,858
LIQUID LEVEL CONTROLLING MEANS
Filed April 19, 1943
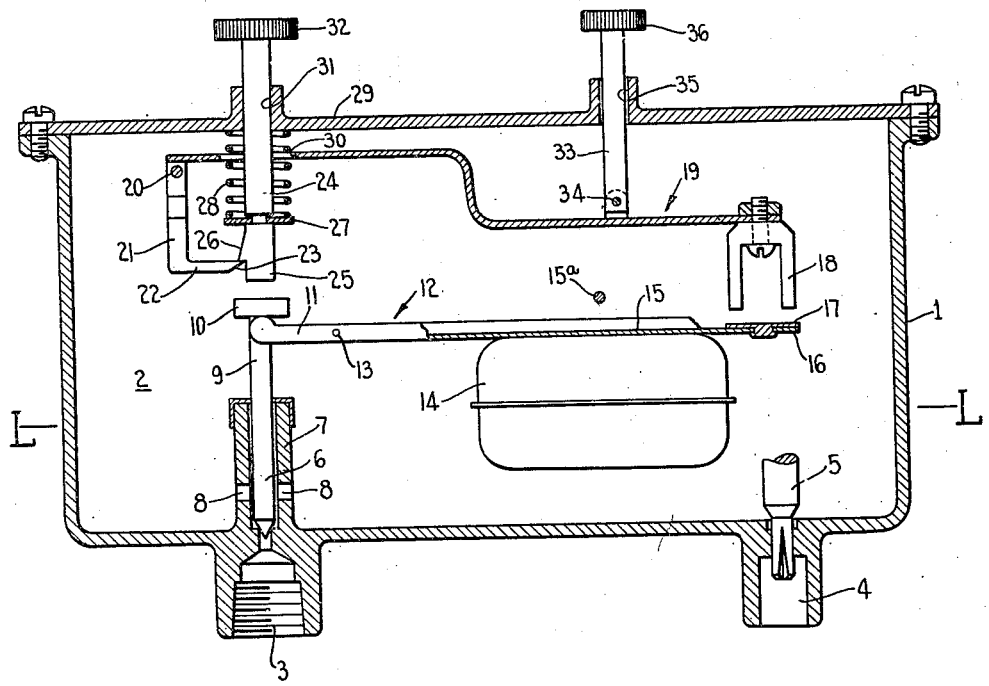
INVENTOR
Philip S. Russel
BY Andrew K. Fouleta
his ATTORNEY Patented Oct. 30, 1945

2,387,858

UNITED STATES PATENT OFFICE 2,387,858

LIQUID LEVEL CONTROLLING MEANS

Philip S. Russel, Detroit, Mich., assignor to Detroit Lubricator Company, Detroit, Mich., a corporation of Michigan Application April 19, 1943, Serial No. 483,593

6 Claims. (Cl. 137—68)

This invention relates to new and useful improvements in liquid level controlling devices and more particularly to safety means operable to close the inlet valve upon increase of liquid level above a desired level.

In prior devices, the safety means has been mechanically released by operation of the float member in response to pressure or force exerted by the float member upon increased displacement of liquid by the float member. The friction in the parts of the safety means has resulted in an indeterminate increase of level and consequent variation in displacement of liquid necessary to create a float member force for operating the safety means. Accordingly an uncontrolled increase in the height of the fire in fuel burners fed by prior devices has occurred before the safety means has been rendered effective.

An object of the invention is therefore to provide a safety means in which the excess level at which the safety means will be actuated can be accurately determined.

Another object is to provide a safety means in which the friction of the parts will not interfere with the release of the safety means at the desired maximum level.

The invention consists in the improved construction and combination of parts to be more fully described hereinafter and the novelty of which will be particularly pointed out and distinctly claimed.

In the accompanying drawing, to be taken as a part of this specification, there is fully and clearly shown a preferred embodiment of the invention, in which drawing:

The figure is a view in vertical section through a liquid level control device embodying the invention.

Referring to the drawing by characters of reference, 1 designates generally a casing or container having a liquid receiving reservoir or chamber 2 with an inlet 3 to be connected to a suitable source of liquid supply, such as an elevated liquid fuel tank. The chamber 2 has an outlet 4 to be connected to the point of use of the liquid in the chamber 2 and which may be a liquid fuel burner. An outlet controlling metering valve 5 cooperates with the outlet 4 to meter fuel to be fed to the burner from the chamber 2. The inlet 3 is controlled by a valve member 6 which is supported for longitudinal vertical reciprocal movement in a tubular guide member 7, through which ports 8 discharge from the inlet 3 into the chamber 2. The valve member 6 has a stem 9 on which there is a head or lateral flange 10 providing a downward facing shoulder. Bearing upward against the downward facing shoulder of the head 10, there is an end portion or arm 11 of a lever 12 which is pivoted intermediate its ends, as at 13, on a pivot pin or shaft supported in the side walls of the casing 1. Carried by the lever 12 and rigidly secured to the other end portion of arm 15, there is a float member 14 positioned on the opposite side of the pin or fulcrum 13 from the portion 11. Cooperable with the arm 15 there is a stop member 15ª which may be a rod or bar extending between the side walls of the casing 1 and positioned above the float member 14 to limit upward lost motion movement of the float member and of the lever arm 15. The lever arm 15 to which the float member 14 is secured extends outward beyond the float member, as at 16, to provide a supporting platform or portion. Mounted on the portion 16 there is an armature member 17 of magnetic material. Cooperable with the armature member 17 there is a magnetic member 18, preferably a U-shaped permanent magnet, which is positioned above the armature 17 and has its legs or poles directed or extending downward. The magnet 18 has its base secured, as by a nut and bolt to one end portion of a resilient latch releasing or controlling lever 19 which is pivotally supported at its other end portion on a pivot pin or fulcrum member 20 supported in the side walls of the casing 1, the pin 20 extending substantially parallel to the float supporting pivot member 13. The pivot pin receiving end portion of the lever 19 is provided with a downward extending lever arm 21 providing a hook or latch portion which carries an inward directed or rebent horizontal arm 22 having an end portion 23 providing a latch or dog. Positioned in alignment with the valve stem 9 and overlying the head 10 in spaced relation thereto, there is a valve closing safety means 24 in the form of a vertically reciprocal plunger having a lower end portion or abutment 25 engageable with and normally spaced above the head 10. The end portion 25 is provided with a downward facing shoulder or abutment member 26 which seats on the latch 25 to hold the plunger 24 in raised inactive position. The plunger 24 carries a supporting flange or seat member 27 on which rests one end of a helical coil spring 28 which surrounds the plunger 24 and is held under compression against the top wall or cover member 29 of the casing 1. The spring 28 and plunger 24 extend upward through an aperture 30 in the lever 19, the plunger 24 being guided in an aperture 31 through the cover member 29. A hand grip member 32 is secured on the plunger 24 external of the casing so that the plunger can be lifted to the position shown for resetting of the safety means and compression of the spring 28. The lever 19 has a reset pull rod 33 pivotally connected thereto, as at 34, and extending upward through an aperture 35 through the cover member 29, the aperture 35 providing a sufficiently loose fit for the member 33, so as to permit some lateral movement and so as not to impede the free downward movement of the member 33. The lever 19 is sufficiently resilient between its magnet supporting end and its fulcrum so that it can be flexed upward subsequent to engagement of the latch 23 in its locking relation to the shoulder or abutment member 26. The end of the member 33 which extends above the cover 29 is provided with a hand grip member 36, by which the member 33 can be lifted to position the latch 23 beneath the shoulder 26, lift the lever member 19 and to flex it upward when the latch member 23 is in locking engagement to the shoulder 26 and the lever arm 15 is in engagement with the stop 15ᵃ so that the magnet 18 can be separated from the armature 17.

The operation of the foregoing control device is as follows. Assuming that the inlet 3 is connected to a supply tank or other source of liquid fuel supply and that the outlet 4 is connected to a fluid fuel burner for example, when the liquid level in the chamber 2 drops below the desired normal level designated by the line L—L, the float member 14 will move downward, thereby lifting the valve member 6 to open position. The float member 14 will act to maintain a substantially constant liquid level at the line L—L so that the head of liquid on the outlet 4 will cause a substantially constant flow for any given setting of the metering valve 5.

Should the valve member 6 fail to seat for any reason and cut off flow through the inlet 3 into the chamber 2 when the float member rises to or slightly above the predetermined desired liquid level at the line L—L, then the increasing liquid level will move the float member 14 upward, rotating the lever 12 about its fulcrum or pivot pin 15 since the end portion 11 is free to move downward away from the head 10. As the armature member 17 approaches the magnet 18, there will be a tendency to lift the float member 14 and when the liquid level has increased sufficiently, say about one sixteenth inch above the line L—L, then the armature member 17 will have been moved sufficiently into the field of the magnet 18 so that the attractive force of the magnetic members for each other will exert a quick pull on the armature member 17. However, the suction effect or vacuum created by any sudden or quick pull or jerk tending to lift the free floating float member 14 out of the liquid will resist such a pulling or jerking force which is here the magnetic pull of the magnet 18, the result being that the magnet 18 will move downward, rotating the lever 19 on its pivot 20, thereby to pull the latch 23 out from under the shoulder 26. As the latch 23 is freed from the shoulder 26, the spring 28 will be released to move the plunger 24 downward to strike the valve stem head 10 and with a percussive force or hammer blow act positively to seat the valve member 6.

When the valve member 6 is thus seated, the liquid level in the chamber 2 will drop below the line L—L, assuming the valve 5 is left open to supply the burner. The safety means may now be reset as follows: The plunger 24 will be pulled upward by the knob 32 until the spring 28 is compressed somewhat beyond that shown in the figure in order to assure the positioning of the latch 23 beneath the shoulder 26. While the spring 28 is thus held compressed, the plunger or pull member 33 will be lifted by the knob 36 to position the latch 23 beneath the shoulder 26. However, the armature 17 will move upward with the lever 19 due to the magnet 18 being in contacting or close attractive relation to the armature 17. In order to separate the magnet 18 from the armature 17, the upward movement of the lever 19 by the member 33 is continued until the lever arm 15 engages the stop member 15ᵃ and then continued movement of the lever 19 will flex the lever 19 between its fulcrum 20 and the member 33 thereby to separate the magnet 18 from the armature 17. The float member will now drop back to its valve operating position, out of the effective attractive field of the magnet 18 and again lifting the valve member to an open position, the liquid level being below the line L—L.

From the foregoing it will be apparent that the float member 14 will function to release the safety means 24 irrespective of the frictional or other resistance to releasing operation of the latch mechanism which holds the safety means retracted. In this construction it is not necessary for any increased force to be built up by further immersion of the float member 14 after the predetermined liquid level is reached in order to release the safety means, since it is not the force exerted by the float 14 but is the magnetic force exerted by the magnet 18 and tending to lift the float member out of the liquid which is the actuating force which releases the safety means.

What is claimed and is desired to be secured by Letters Patent of the United States is:

1. A liquid level controlling device comprising a casing having a chamber for liquid with an inlet and an outlet, a valve controlling said inlet, a float responsive to liquid level in said chamber and operable upon the occurrence of a predetermined level to close said valve, safety means operable to move said valve to closed position, means controlling actuation of said safety means, cooperable magnet and armature members, one of said members being movable with said float, the other of said members being carried by said controlling means, and means for overtravel of said float upon failure of said valve to close said inlet, said one of said members being movable into attractive relation to the other of said members upon overtravel of said float thereby to operate said controlling means.

2. A liquid level controlling device comprising a casing having a chamber for liquid with an inlet and an outlet, a valve controlling said inlet, a float responsive to liquid level in said chamber and operable upon the occurrence of a predetermined level to close said valve, thrust means operable to move said valve to closed position, means urging said thrust means in valve closing direction, releasable means holding said urging means against operation, cooperable magnet and armature members, one of said members being movable with said float, the other of said members being carried by said releasable means, and means for overtravel of said float upon failure of said valve to close said inlet, said one of said members being movable into attractive relation to the other of said members upon overtravel of said float thereby to operate said releasable means.

3. A liquid level controlling device comprising a casing having a chamber for liquid with an inlet and an outlet, a valve controlling said inlet, a float responsive to liquid level in said chamber and operable upon the occurrence of a predetermined level to close said valve, thrust means operable to move said valve to closed position, a spring urging said thrust means in valve closing direction, a lever cooperable with said thrust means and holding said thrust means against operation by said spring, cooperable magnet and armature members, one of said members being movable with said float, the other of said members being carried by said lever, and means for overtravel of said float upon failure of said valve to close said inlet, said one of said members being movable into attractive relation to the other of said members upon overtravel of said float thereby to operate said lever to release said thrust means.

4. A liquid level controlling device comprising a casing having a chamber for liquid with an inlet and an outlet, a valve controlling said inlet, a float responsive to liquid level in said chamber and operable upon the occurrence of a predetermined level to close said valve, safety means operable to move said valve to closed position, means controlling actuation of said safety means, cooperable magnet and armature members, one of said members being movable with said float, the other of said members being carried by said controlling means, means for overtravel of said float upon failure of said valve to close said inlet, said one of said members being movable into attractive relation to the other of said members upon overtravel of said float thereby to operate said controlling means, resetting means cooperable with said controlling means, means to separate said magnet and armature members for resetting of said safety means, and means to position said safety means in position to be controlled by said controlling means.

5. A liquid level controlling device, comprising a casing having a chamber for liquid with an inlet and an outlet, a valve controlling said inlet, a float responsive to liquid level and operable upon occurrence of a predetermined level to close said valve, cooperable magnet and armature members, one of said members being movable with said float, means for overtravel of said float upon increase of liquid level above said predetermined level, said float moving said one member into attractive relation to the other member upon such overtravel, and safety means cooperable with said members and operable to move said valve to closed position, said safety means being actuated upon magnetic movement of one of said members by the other.

6. A liquid level control device comprising a casing having an inlet for liquid, a valve controlling and operable to close said inlet, float means cooperating with and operable to move said valve to maintain a predetermined liquid level in said casing, striker means governed by said float means and operable to strike said valve a closing blow in the event the level of the liquid changes a predetermined amount from said predetermined level, and magnetic means including a permanent magnet member and an armature member cooperable with said striker means, one of said members being movable by said float means into magnetically attractive relation to the other of said members for effecting operation of said striker means when the liquid level changes said predetermined amount.

PHILIP S. RUSSEL.